Patented Apr. 23, 1929.

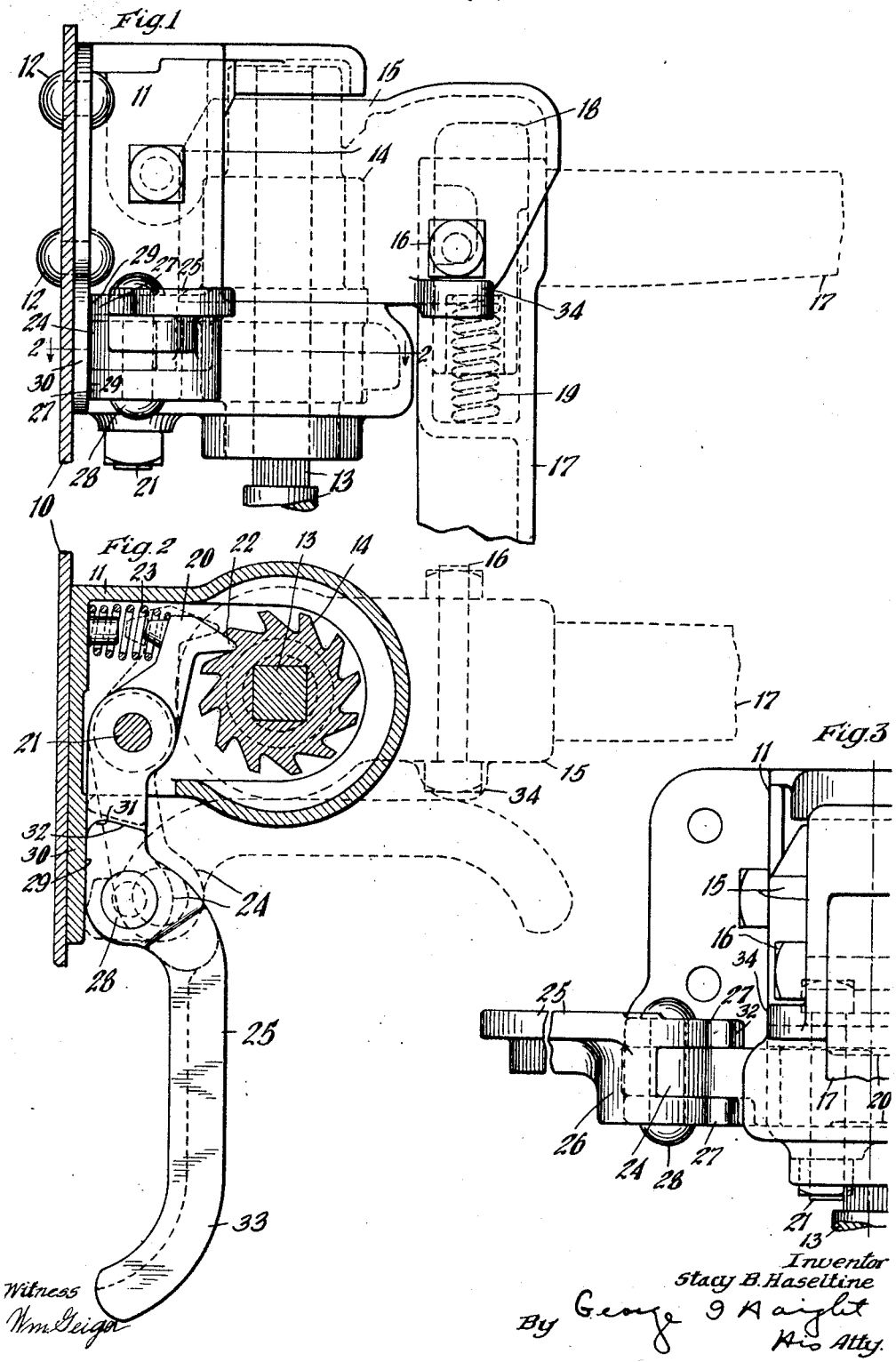

1,710,213

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

HAND BRAKE.

Application filed May 6, 1927. Serial No. 189,201.

This invention relates to hand brakes.

An object of the invention is to provide a hand brake including operating mechanism adapted to rotate the brake staff to wind the brake chain thereon, and a holding dog for preventing reverse rotation of the brake staff, the latter including an extension by means of which the holding dog may be released, in conjunction with locking mechanism automatically engageable with said extension when moved in a releaing direction to maintain the dog inoperative and permit complete unwinding of the brake chain from the staff, said locking mechanism being automatically disengageable through movement of the operating means when it is again desired to set the brake.

A more particular object of the invention is to provide locking mechanism of the character above referred to wherein a lever is pivotally connected with the outer end of the release extension in such manner as to provide a cam portion adjacent the pivotal connection adapted to engage a fixed abutment, such as a portion of the brake bracket, so as to force the release extension in a direction to release the dog, and after being moved a predetermined distance, to hold the dog out of engaging position, said lever when in position to hold the dog out of engagement being disposed in the path of the operating mechanism whereby movement of the latter in a direction to effect winding movement of the brake staff moves the lever and overcomes the locking engagement of the cam and permits the lever to resume initial position.

Other and further objects of the invention will more clearly and fully appear from the description and claims hereinafter following.

In the drawings forming a part of this specification, Figure 1 is a vertical sectional view through the end wall of a car, showing a side elevational view of the brake mechanism with my improvements incorporated therein, the operating lever being shown in its normal depending inoperative position in full lines and in raised operative position in dotted line. Figure 2 is a horizontal sectional view of the invention corresponding substantially to the line 2—2 of Figure 1 showing the releasing lever for the dog in normal inoperative position in full lines, and in locking position in dotted lines. And Figure 3 is a fragmentary front elevational view of the brake mechanism showing the invention embodied therein.

As shown in the drawings, the end wall of the car is indicated at 10, and to the end wall is secured a housing or bearing bracket designated generally by the reference character 11. The housing 11 is secured to the wall 10 by suitable rivets 12—12, and projecting into the housing is the usual vertical brake staff, a portion of which is indicated at 13, the staff having a square or other non-circular cross section at the top thereof on which is rigidly fitted a ratchet wheel indicated at 14, the ratchet wheel being provided with lower and upper sets of teeth in the usual manner. Oscillatably mounted within the housing 11 is a carrier or fulcrum member 15, said fulcrum member being adapted to swing about the axis of the ratchet wheel on suitable journals provided by the ratchet wheel and the housing in a manner common to this type of brake. The fulcrum member 15 is provided with a pivot bolt 16 which extends through the side walls thereof and swingably mounted upon the bolt 16 is an operating lever 17. The lever 17 is provided with a pawl 18 urged outwardly by means of a spring 19 in such manner that when the operating lever 17 is raised to horizontal position, the pawl 18 engages the teeth of the ratchet wheel 14 and oscillation of the operating lever 17 effects rotation of the ratchet wheel 14 and hence of the staff 13, in a direction to wind the brake chain thereon.

To hold the staff 13 against reverse rotation, a locking dog 20 is provided, said dog being pivotally mounted upon a vertically extending bolt 21 in the housing 11, said dog having a tooth 22 at one end adapted to engage the ratchet wheel, and the toothed end of the dog being normally urged toward engaged position with the ratchet wheel by means of a coiled spring 23 interposed between the wall of the housing and the toothed end of the dog. The dog 20 is provided with a tail or lever extension 24, which is preferably disposed at a slight angle to the toothed portion of the dog and extends outwardly of the housing 11 a suitable distance, as best shown in Figure 2. Co-operating with the extension 24 of the dog 20 is a release lever 25. The lever 25 at its inner end is provided with an off-set 26, having a bifurcated extension including the furcations 27—27 disposed upon opposite sides of the outer end of the extension 24 of the dog 20 and pivotally secured thereto by means of a rivet 28. Each of the furcations 27—27 is provided with a flat face 29 adapted in the normal position of the parts to coincide with the adjacent face of the extension 24, and to rest against the fixed abutment 30 provided by a portion of the bracket 11, so that the spring 23 bearing on the toothed end of the dog presses the extension 24 and the flat faces 29—29 of the lever 25 against the abutment 30, and hence maintains the lever 25 in inoperative position as best shown in full lines in Figure 2. The furcations 27 are each provided with a cam face indicated at 31, and with a locking face indicated at 32, both of which are adapted to engage with the abutment 30 when the lever is swung through an operative movement to the position indicated in dotted line in Figure 2. The outer end of the lever 25 indicated at 33 is curved as shown, and the fulcrum member 15 is provided with an off-set 34 located in such position as to be in line with the outer end 33 of the lever 25 when the latter is in position to hold the dog disengaged, whereby oscillation of the fulcrum member 15 causes engagement of the off-set 34 with the lever 25 to move the same in such manner as to break the locking engagement of the lever 25 with the dog 20 and permit the lever 25 to resume inoperative position.

In operation, when it is desired to wind the brake staff in a direction to set the brakes, assuming the parts to be in the position shown in full lines in Figure 1, the lever 17 is elevated to engage the pawl 18 with the ratchet wheel 14, and oscillation of the lever 17 effects winding of the brake staff 13 in a clock-wise direction. The dog 20 under the influence of the spring 23 prevents reverse rotation of the ratchet wheel 14 and staff 13 during the winding operation, in the ordinary manner, the ratchet movement of the dog being permitted. Assuming the brakes to have been fully set, and it is desired to release the same, the operating lever 17 is dropped to its normal depending position, and the lever 25 grasped by the operator and pulled in a counter-clockwise direction. This brings about pivotal movement of the lever 25 upon the pivot 28 carried by the extension 24 on the dog 20, causing the cam face 31 to bear against the abutment 30, which exerts force upon the extension 24 of the dog 20 to move the same in a counter-clockwise direction, continued movement of the lever 25 in the direction indicated causing the locking face 32 to come into engagement with the abutment 30 which prevents the lever 25 from return movement and consequently locks the dog 20 out of engagement with respect to the ratchet wheel 14. In this position of the parts, the brake staff is free to fully unwind under the jarring of the train.

When it is desired to again set the brakes, the operating lever 17 is moved to horizontal position, and upon movement of the fulcrum member 15 in a clockwise direction, the off-set 34 comes into contact with the lever 25 and moves the same in a clockwise direction a sufficient distance to disengage the locking face 32, after which, due to the disposition of the cam face 31 and the pivotal connection of the lever 25 with the dog 20, the extension 24 of the dog, under the influence of the spring 23, is pressed toward the abutment 30, causing a return of the lever 25 to its normal disengaged position.

While I have herein shown and described what I consider the preferred manner of carrying out the invention, the same is merely illustrative, and I contemplate all changes and modifications which come within the scope of the claims appended hereto.

I claim:

1. In a hand brake, the combination with a member adapted to be rotated to effect tightening of a brake chain; of a ratchet wheel rotatable with said member; a pivoted locking dog co-operable with said ratchet wheel, said dog being normally urged to operative position and provided with an extension; a lever having cam means at one end, said lever being pivotally connected to said extension at a point inwardly of said cam means, said cam means being provided with a flat face at one side; and an abutment co-operative with the flat face of said cam means for maintaining said lever in predetermined position, swinging of said lever in one direction from predetermined position serving to retract said locking dog from engagement with said ratchet wheel.

2. In a hand brake, the combination with a member adapted to be rotated to effect tightening of a brake chain; of a ratchet wheel rotatable with said member; a pivoted locking dog co-operable with said ratchet wheel, said dog being normally urged to operative position and provided with an extension; a lever having cam means at one end, said lever being pivotally connected to said extension at a point inwardly of said cam means, said cam means being provided with a flat face at one side; an abutment co-operative with the flat face of said cam means for maintaining said lever in predetermined position, swinging of said lever in one direction from predetermined position serving to retract said locking dog from engagement with said ratchet wheel, said cam means being provided with a locking face engageable with said abutment after predetermined movement of said lever to lock said lever and cam means in position to maintain said locking dog out of engagement with said ratchet wheel; and operating means for rotating said member in a winding direction, said operating means having elements engageable with said lever when the same is in locking position to move the same and break the locking connection between said cam means and said abutment and permit said lever to resume its initial position.

3. In a hand brake, the combination with a member adapted to be rotated to effect tightening of a brake chain; of a ratchet wheel rotatable with said member; operating means for the ratchet wheel, including a handle; a pivoted locking dog co-operable with said ratchet wheel; spring means for normally urging said dog to ratchet engaging position; a fixed abutment; means for disengaging said dog from the ratchet wheel, including a lever pivoted to the tail of the dog and having a cam head portion engageable with said abutment when said lever is moved in one direction to effect retraction of said dog from engagement with said ratchet wheel and for holding the dog so retracted, said lever being disposed in the path of movement of said operating means when the cam is in the holding position, whereby upon operation of the handle in a direction to tighten the chain the lever is engaged by said operating means to release the dog.

In witness that I claim the foregoing I have hereunto subscribed my name this 3rd day of May, 1927.

STACY B. HASELTINE.